J. A. PILCHER.
BRAKE LEVER FOR CAR TRUCKS.
APPLICATION FILED APR. 1, 1916.
1,241,440.
Patented Sept. 25, 1917.
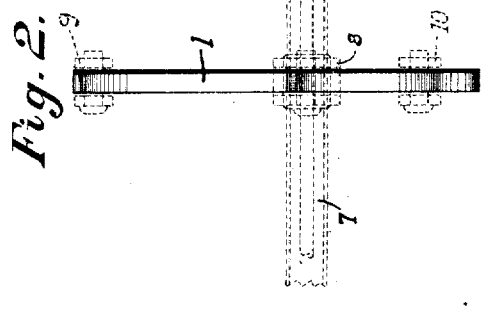
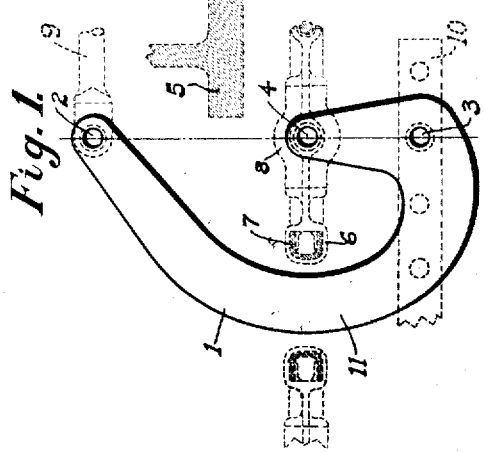
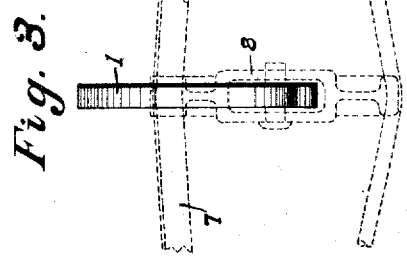
Witness Earl H. Fisher.
Inventor
John A. Pilcher
By B. W. Kade,
Attorney

UNITED STATES PATENT OFFICE.

JOHN A. PILCHER, OF ROANOKE, VIRGINIA.

BRAKE-LEVER FOR CAR-TRUCKS.

1,241,440. Specification of Letters Patent. Patented Sept. 25, 1917.

Application filed April 1, 1916. Serial No. 88,279.

*To all whom it may concern:*

Be it known that I, JOHN A. PILCHER, a citizen of the United States, residing at Roanoke, in the county of Roanoke and State of Virginia, have invented certain new and useful Improvements in Brake-Levers for Car-Trucks, of which the following is a specification.

This invention pertains to brake levers for use in connection with railway equipment, and the present application is a companion to my co-pending application Serial Number 88,280, filed April 1, 1916. The principal object thereof is to provide a three-hole lever having an open space between the middle and the top hole, and adapted for use with existing forms of brake beams.

With this and other objects in view the invention consists in the peculiar formation of a lever as set forth herein, also in combination therewith the various related truck parts as herein described and as particularly claimed.

In the accompanying drawings, Figure 1 is a side elevational view of the lever of my invention, certain related brake parts and a portion of the truck structure being shown in dotted lines and partly in section. Fig. 2 is an end elevational view and Fig. 3 a plan view of the same, certain brake parts being shown in dotted lines.

Referring to these drawings it will be seen that this lever is of the three-hole type with transversely disposed holes at the upper and lower extremities and a similar middle hole between these extremities. These holes are in substantial alinement in side elevational view as indicated in the drawings. It is customary to form such levers of a continuous and straight bar of material extending from extreme hole to extreme hole. The lever of my invention, however, which is denoted in the drawings by the numeral 1, is formed in the shape of a hook, with the hole 2 at the upper extremity located at what may be termed the eye of the hook, and the hole 3 at the bottom extremity located at what may be termed the bend of the hook. The middle hole 4 is located at the point of the hook. It will thus be seen that the lever progresses in a path which may be said to originate at the middle hole 4, progressing thence in a direct path to the hole 3 at the lower extremity and progressing thence in a curved path up to the hole 2 at the upper extremity, and it will be seen further that there is no direct connecting metal between the middle hole and the hole at the upper extremity. The absence of this metal provides a space which may be occupied by a portion of the truck such as designated 5 and thus serves to provide additional width for such a member over that possible when a straight lever is used. The brake beam 6, served by this lever, is pivotally connected thereto at the middle hole 4. The brake beam is of the commercial type with a transverse bar member 7, a transversely pierced jaw-shaped fulcrum 8 being attached to the front side of the bar member. The lever 1 is curved around the back of the bar member in its path from the bottom hole to the top hole, and where two reversely-disposed brake beams are used may pass between the backs of the two beams.

The lever 1 is actuated by means of one or the other of lever-actuating members 9 and 10, and in the actuation thereof this lever swings normally around the axis of the hole 4 as a pivot. In order to provide constant clearance for the lever, the curvature of the same at 11 is in an arcuate path swung about the axis of the hole 1 as a center. The lever-actuating members are attached to the said lever at the end holes 2 and 3, respectively, and the lever when so formed and connected may be applied in place of any ordinary straight lever, the action in use being the same, but the improved form of lever providing the additional space between the middle and upper holes for the other part of the truck structure.

This lever may be used either with truck construction or car body construction or at other places, as it frequently occurs that this space is desirable.

Having thus described my invention, what I claim as new and desire to secure by Letters Patent is:

1. A lever having three holes therein in substantial alinement, the lever progressing in a path originating at the middle hole, progressing thence to an end hole and thence to the other end hole, where the same terminates.

2. A lever having three holes therein in substantial alinement, the lever originating at the middle hole and progressing in a direct path to the hole at the lower extremity and progressing thence in a curved path to the hole at the upper extremity.

3. A lever having three holes therein in substantial alinement, the lever originating at the middle hole and progressing in a direct path to the hole at the lower extremity and progressing thence in an arcuate path to the hole at the upper extremity, the said arcuate path being swung about the axis of the middle hole as a center.

4. A lever having three holes therein in substantial alinement, there being a bar of metal extending between the middle hole and the hole at the lower extremity and a bar of metal extending between the two extreme holes, but there being no direct connecting metal between the middle hole and the hole at the upper extremity.

5. In combination, a brake beam having a bar member with a fulcrum member attached to the front side thereof, a brake lever having three holes in substantial alinement, the said lever being pivoted to the said fulcrum at the middle one of its three holes, the remaining two of said holes being disposed respectively above and below the said fulcrum, there being a portion of the lever extending from the said middle hole thereof to the bottom hole and a portion curved around the back of the said bar member and extending from the bottom hole to the top hole, but no direct connecting portion between the middle hole and the top hole.

6. A three-hole brake lever formed in the shape of a hook, the end holes thereof being respectively at the eye of the hook and at the bend thereof, the middle hole being at the point of the hook, in combination with a brake beam, and a pair of lever-actuating members, the said brake beam being pivoted to the said lever at the middle hole thereof, and one of said lever-actuating members being attached to said lever at each of the end holes thereof.

In testimony whereof I affix my signature in presence of two witnesses.

JOHN A. PILCHER.

Witnesses:
H. B. WADE,
ROY K. BROWN.